US006733046B1

(12) United States Patent
Rief

(10) Patent No.: US 6,733,046 B1
(45) Date of Patent: May 11, 2004

(54) HOSE SWIVEL CONNECTION APPARATUS

(75) Inventor: Dieter J. Rief, Santa Rosa, CA (US)

(73) Assignee: Pollvergnuegen, Santa Rosa, CA (US)

( * ) Notice: Subject to any disclaimer, the term of this patent is extended or adjusted under 35 U.S.C. 154(b) by 0 days.

(21) Appl. No.: 10/279,544

(22) Filed: Oct. 24, 2002

(51) Int. Cl.[7] ............................................. F16L 27/00
(52) U.S. Cl. .................... 285/276; 285/903; 285/921; 285/319
(58) Field of Search ............................. 285/903, 921, 285/276, 279, 280, 281, 147.3, 319

(56) References Cited

U.S. PATENT DOCUMENTS

| 921,691 A | * | 5/1909 | Friday | 285/276 |
|---|---|---|---|---|
| 2,269,431 A | * | 1/1942 | Allen et al. | 285/276 |
| 2,509,119 A | * | 5/1950 | Warren | 285/147.1 |
| 3,363,919 A | * | 1/1968 | Brazell, II | 285/276 |
| 4,749,192 A | * | 6/1988 | Howeth | 285/86 |
| 5,067,754 A | * | 11/1991 | Bartholomew | 285/319 |
| 5,112,086 A | * | 5/1992 | Gruber et al. | 285/86 |
| 5,293,659 A | | 3/1994 | Rief et al. | |
| 5,407,236 A | * | 4/1995 | Schwarz et al. | 285/23 |
| 5,775,741 A | | 7/1998 | Rice et al. | |
| 6,199,920 B1 | * | 3/2001 | Neustadtl | 285/322 |
| 6,279,961 B1 | | 8/2001 | Stoltz | |
| 6,292,970 B1 | | 9/2001 | Rief et al. | |

FOREIGN PATENT DOCUMENTS

WO WO 01/92663 12/2001

* cited by examiner

*Primary Examiner*—David Bochna
(74) *Attorney, Agent, or Firm*—Jansson, Shupe & Munger, Ltd

(57) ABSTRACT

A hose swivel connection apparatus for connecting a pair of hose sections, the swivel member having male and female swivel members with underlap and overlap portions, respectively, forming radially-facing annular ball grooves between which bearing balls are captured to provide swiveling and to hold the swivel device together, and a seal between the swivel members, preferably a ring seal positioned between a pair of axially-facing opposed seal-abutment surfaces. The invention also involves hose-end couplings on swivel members of a swivel device, the couplings each having a sleeve member over and permanently secured to a hose section and being adapted for snap-engagement with one of the swivel members.

15 Claims, 6 Drawing Sheets

HOSE SWIVEL CONNECTION APPARATUS

FIELD OF THE INVENTION

The present invention relates to connections between adjacent hose sections and, more particularly, to hose swivel connections usable with apparatus such as automatic swimming pool cleaners that move freely along the underwater surfaces of swimming pools while tethered at the end of a hose.

BACKGROUND OF THE INVENTION

Automatic swimming pool cleaners of the type that automatically move along underwater surfaces of swimming pool are widely used for dislodging and collecting debris and sediment from swimming pools. Each pool cleaner of this type typically moves about underwater pool surfaces, propelled in one way or another by the flow of water either from or to the pool cleaner through a long hose line by which the pool cleaner is tethered to a port along the swimming pool wall.

When the water flow through the hose line is from the pool cleaner, the pool cleaner is often referred to as a vacuum cleaner, and the debris is typically collected in a filter remote from the swimming pool. Excellent examples of such vacuum pool cleaners include those disclosed and claimed in U.S. Pat. No. 5,293,659 (Rief et al.), entitled "Automatic Swimming Pool Cleaner," and U.S. Pat. No. 6,292,970 (Rief et al.), entitled "Turbine-Driven Automatic Swimming Pool Cleaners." In the latter patent, the primary embodiments relate to swimming pool vacuum cleaners manufactured by Poolvergneugen, of Santa Rosa, Calif.

When the water flow through the hose line is to the pool cleaner, the pool cleaner is often referred to as a pressure cleaner, and the debris is typically collected in a bag secured to the pool cleaner. An excellent example of such pressure cleaners is disclosed in PCT International Publication No. WO 01/92663 (Rief et al.), entitled "Swimming Pool Pressure Cleaner with Internal Steering Mechanism," owned by the aforementioned Poolvergneugen, of Santa Rosa, Calif., and in U.S. patent application Ser. No. 10/296,779, one of the patent applications resulting from such PCT international publication.

In both types of automatic swimming pool cleaners, the hose lines, depending upon overall hose line length, are frequently each made up of two or more hose sections coupled to one another in end-to-end fashion. In many cases, the movement of the automatic pool cleaner tends to have a "pretzeling" or kinking effect on the hose line. This can be particularly aggravated in the absence of a swivel device at some point along the hose line and, as has been appreciated in connection with development of this invention, in the absence of sufficient swivel devices along the hose line.

Various types of hose swivel apparatus have been developed in the prior art. Some examples of such prior apparatus are those disclosed in U.S. Pat. No. 5,775,741 (Rice et al.) and U.S. Pat. No. 6,279,961 (Stoltz), and devices marketed by Polaris and Letro. Various hose swivel devices of the prior art, however, have a number of problems and disadvantages, some of which are described below.

Prior hose swivel connection apparatus frequently involve what are referred to as "hose nuts" that are used to couple hose ends to swivel devices. The flexible hose typically used with automatic swimming pool cleaners includes on its outer surface a continuous tight spiral projection which is in a thread-like form. When the rigid tubular projecting end of a hose swivel device is inserted into the open end of the hose, a hose nut which is around such tubular end and has internal threading sized to engage a portion of the spiral projection on the outer surface of the hose, thereby to firmly engage the hose to the swivel device.

Coupling a hose to a swivel device using such hose-nut couplings is a difficult and time-consuming operation. For many, particularly persons with rather limited wrist strength, the use of such devices is problematic. In this connection, it is known that women form the majority of persons involved in swimming pool care; therefore, the above-noted problems of coupling hoses to swivel devices are particularly troublesome and important. Regardless of limitations in wrist strength, however, the coupling of hose ends to hose swivel devices is time-consuming process.

Certain other kinds of hose swivel connection apparatus involve use of clamps of various kinds to couple hose ends onto hose swivel devices. Clamping devices typically involve some sort of ring clamp about a hose for the purpose of assuring that the inside surface of the end portion of a hose section is firmly engaged with the outer surface of the rigid tubular projecting end of a hose swivel device which was inserted into the end of the hose section. Such hose coupling devices may be even more difficult and time-consuming to use than the problematic hose nuts referred to above.

Each hose swivel engaged with the ends of two adjacent hose sections requires, of course, the attaching of two hose couplings—one on each end, and this obviously involves a substantial effort. Since it may be highly preferred to have a plurality of hose swivel devices along the length of a hose line tethering an automatic swimming pool cleaner in its operational mode, the problems and difficulties of providing a suitable kink-resistant (or "pretzeling-resistant") hose line are multiplied, and this discourages efforts to create pool cleaner hose lines which minimize the possibility of kinking problems.

Another problem of certain hose swivel connection apparatus of the prior art is a problem of line constriction. If, for example, the apparatus includes a swivel device with rigid tubular projecting ends which are inserted inside the ends of hose sections, then such apparatus involves flow constrictions. Flow constrictions along hose lines used with automatic swimming pool vacuum cleaners are problematic, because such constrictions slow down the flow of water and debris to a remote filter.

Reduced flow caused by flow constrictions tend to reduce the effectiveness of a automatic pool cleaner in moving along underwater surfaces of a pool, regardless of the exact nature of the flow-driven propulsion system used in the pool cleaner. This applies to both vacuum cleaners and pressure cleaners. Furthermore, such flow constrictions can result in clogging of the hose line used with swimming pool vacuum cleaners, particularly on those occasions when major amounts of debris (e.g., leaves in the fall) are passing through the hose line. Any partial or complete clogging of the hose line also reduce or stop pool cleaner movement.

Still another shortcoming of the prior art is that certain prior hose swivel connection apparatus includes swivel devices made of many parts, a factor involving cost and assembly disadvantages. Having simple, easy-to-assemble apparatus would have advantages—both in initial assembly and in connection with any necessary repair. It is important that hose swivel connection apparatus be free of leaks, and part-count reduction and simplification are factors tending to result in a greater proneness to leakage.

While multi-section hose lines and prior hose swivel connection apparatus has been discussed in connection with particular reference to automatic swimming pool cleaners, hose swivel connection apparatus of various types are used in a wide variety of other applications, including other applications in which the ability of such couplings to freely swivel and to be quickly, easily and reliably coupled to hose sections is a matter of importance.

This invention addresses such the problems and shortcomings in prior hose swivel connection apparatus.

OBJECTS OF THE INVENTION

It is a primary object of this invention to provide improved hose swivel connection apparatus overcoming some of the problems and shortcomings of the prior art, including those mentioned above.

Another object of this invention is to provide an improved hose swivel connection apparatus for use with automatic swimming pool cleaners—both vacuum cleaners or pressure cleaners.

Another object of this invention is to provide an improved hose swivel connection apparatus allowing quick and easy coupling of hose sections to a swivel device.

Another object of this invention is to provide an improved hose swivel connection apparatus allowing coupling of hose sections to a swivel device by persons without great wrist strength.

Another object of this invention is to provide an improved hose swivel connection apparatus allowing coupling of hose sections to a swivel device without the need for tools.

Another object of this invention is to provide an improved hose swivel connection apparatus which is substantially free of flow-constricting structure.

Another object of this invention is to provide an improved hose swivel connection apparatus which allows unrestricted flow of water and debris through a swimming pool cleaner hose line even when such hose line is formed of more than one hose section.

Another object of this invention is to provide an improved hose swivel connection apparatus which allows unrestricted flow of water and debris through a swimming pool cleaner hose line regardless of the presence of one or more swivel devices along the hose line.

Still another object of this invention is to provide an improved hose swivel connection apparatus which facilitates consistent operation of automatic swimming pool cleaners at full power by avoiding clogging in hose lines.

Another object of this invention is to provide an improved hose swivel connection apparatus which facilitates trouble-free operation of automatic swimming pool cleaners (both vacuum cleaners and pressure cleaners) by avoiding or minimizing any tendency for hose line to kink as the pool cleaner is propelled about underwater pool surfaces.

Yet another object of this invention is to provide an improved hose swivel device which is easy to assemble and simple to repair.

Yet another object of this invention is to provide an improved hose swivel device of only a few part and a simple, but highly reliable design.

These and other objects of the invention will be apparent from the following descriptions and from the drawings.

SUMMARY OF THE INVENTION

This invention involves improvements in hose swivel connection apparatus of the type for connecting a pair of hose sections end-to-end along an axis, i.e., the type of swivel connection apparatus which includes hose-end couplings for the ends of the hose sections to be joined and a swivel device to which the hose sections are removably attached by the couplings. The improvements of this invention particularly relate to hose swivel connection apparatus for pool cleaners—either vacuum cleaners or pressure cleaners.

One aspect of this invention is an improvement in the swivel device, the swivel device including a male swivel member which is adapted for removable attachment of one of the couplings and includes an "underlap" portion having a particular relationship to an overlap portion of a female swivel member. More specifically, the underlap portion of the male swivel member has an outer surface with a radially-outwardly-facing first annular ball groove, and the overlap portion of the female swivel member has an inner surface with a radially-inwardly-facing second annular ball groove aligned with the first ball groove, and a multiplicity of bearing balls are captured in and between the first and second radially-facing ball grooves. A seal, preferably a ring seal provides substantially fluid-tight inter-engagement of the male and female swivel members.

In this configuration, the bearing balls serve to provide free swiveling motion between the male and female swivel members, but also serve to reliably secure the male and female swivel members to one another. This eliminates the need for other parts in order to secure hold the swivel device together, and simplifies the structure of the swivel device.

In highly preferred embodiments, the male swivel member includes an axially-facing annular first seal-abutment surface, and the female swivel member includes an annular second seal-abutment surface facing the annular first seal-abutment surface. The aforementioned seal, preferably a ring seal, is positioned between the first and second axially-facing seal-abutment surfaces. The overall simple structure provides an excellent swivel device which is strong, reliable, well-sealed and free-wheeling, and therefore provides excellent hose swivel connection apparatus between hose sections of a hose line to which an automatic swimming pool cleaner is tethered.

In highly preferred embodiments, one hose-end coupling, but most preferably each of the hose-end couplings, includes a sleeve member that is sleeved over a hose section near the end of the hose section. The sleeve member has a distal portion which is permanently secured to the end of the hose and a proximal portion that is adapted for snap-engagement with one of the swivel members. This allows the coupling, and thus the hose with it, to be easily attached to and detached from the swivel member of the hose swivel connection apparatus.

In such embodiments, the proximal portion of such coupling sleeve member preferably has at least one detent which is biased radially outwardly and depressible radially inwardly, and the swivel member has a coupling engagement portion to receive the sleeve member. Such coupling engagement portion of the swivel member is sized to receive the sleeve member when the sleeve-member detent is manually depressed, and the coupling engagement portion has at least one lateral catch aperture which is positioned and sized to receive and engage the detent, the engagement being by virtue of the outward bias of the detent.

In other words, a hose-end coupling (just described) comes into engagement with one of the swivel members (just described) of the swivel device when the detent, by virtue of its outward bias, snaps into the aperture at that time in the insertion process (of sleeve member into coupling engagement portion) when the position of full engagement of coupling and swivel member is achieved. This highly preferred embodiment facilitates attachment of a hose section to a swivel member.

In such embodiments, the coupling engagement portion of the swivel member preferably has a pair of lateral apertures for engagement with a corresponding pair of detents of the sleeve member. Most preferably, such detents and lateral apertures are spaced about 180° apart, a configuration which facilitates manual depression. Other arrangements, however, are possible.

The proximal portion of the sleeve member is preferably large enough such that its inner surface, which is substantially cylindrical, has a diameter somewhat greater than the outer diameter of the hose. This facilitates manual depression of the detents; i.e., depression is allowed without squeezing the hose wall inwardly.

In highly preferred embodiments of the type described above, each of the hose-end couplings has a sleeve member as described and each of the swivel members of the swivel device has a coupling engagement portion as described. This allows each of the couplings which engage the swivel device to be easily attached to and detached from the swivel member.

In highly preferred embodiments of this invention, the male and female swivel members have inside surfaces defining cross-sectional areas that are substantially congruent to the cross-sectional area of the hose. With this configuration, the hose swivel connection apparatus will not impose any constriction on the flow of water and debris along the hose line. In other words, the flow through the couplings and the swivel device will be substantially unrestricted. With unrestricted flow of water and debris, an automatic swimming pool cleaner can operate at maximum power. Thus, there is no diminution in the propulsion or in the cleaning ability of an automatic swimming pool cleaner utilizing this invention. Furthermore, there is a significant reduction in the possibility of clogging with debris during operation, even under difficult heavy-debris conditions.

As noted above, the preferred hose-end couplings of this invention include a coupling sleeve member having a distal portion which is permanently secured to the end of the hose. Thus, an owner of an automatic swimming pool cleaner would have hose sections with permanently mounted hose-end coupling at one or both of the ends thereof, to facilitate attachment with and detachment from swivel devices like that described above. It is preferred that such permanent securement of coupling sleeve member to hose end be by an adhesive, and it is most preferred that such adhesive be a hot-melt adhesive.

Another aspect of this invention involves an improved hose swivel connection apparatus for connecting a pair of hose sections along an axis, the apparatus being of the type including hose-end couplings and a swivel device including first and second swivel members swivelable with respect to each other and to which the hose sections are removably attached by such couplings. The improvement involves at least one, and preferably each, of the hose-end couplings having a sleeve member as described above—i.e., a sleeve member which is sleeved over a hose section near the end thereof and has a distal portion permanently secured to the end of the hose and a proximal portion adapted for snap-engagement with one of the swivel members. As already noted, this configuration allows the hose-end coupling(s) to be easily attached to and detached from the swivel member (s).

Still another aspect of this invention involves an automatic swimming pool cleaner tethered to a hose line which includes the hose swivel connection apparatus of this invention, preferably a plurality of such devices spaced along the hose line—depending upon its length. The inventive hose swivel connection apparatus facilitates operation of automatic swimming pool cleaners without kinking of the hose line, thereby reliably allowing proper pool cleaner orientation with respect to the surface along which it is traveling. This invention has applicability to automatic pool cleaners of both the vacuum cleaner type and the pressure cleaner type.

As used herein, the term "bearing balls" refers to the multiplicity of small hard balls between the male and female swivel members of the device of this invention. Such balls are themselves sometimes referred to as "ball bearings," even though reference is only to the balls themselves. As used herein, the term "underlap" describes one of two concentric overlapping members (or portions of members), i.e., the radially inner member (or portion), while the term "overlap," of course, describes the concentric overlapping member (or portion) which is in the radially outer position.

As specific embodiment of the invention as discussed above is shown in the drawings and will be described in detail below.

DETAILED DESCRIPTION OF PREFERRED EMBODIMENTS

Figure 1:
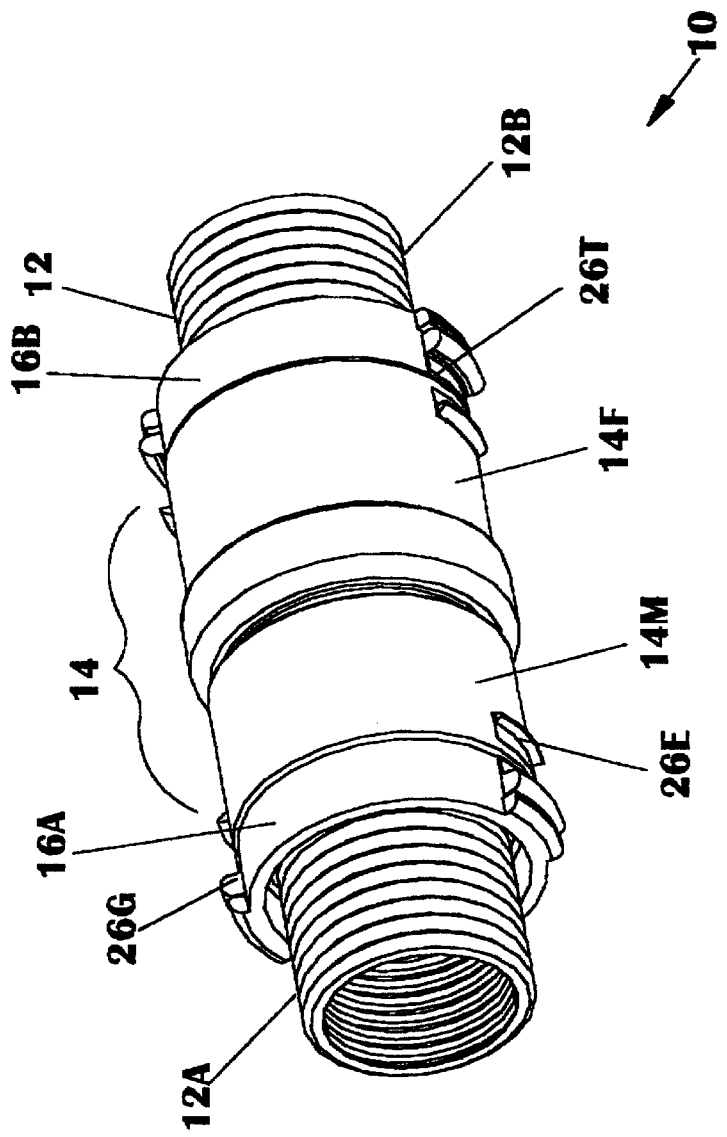
FIG. 1 is a perspective view of a preferred hose swivel connection apparatus in accordance with this invention, assembled and joining two hose sections together.
Figure 2:
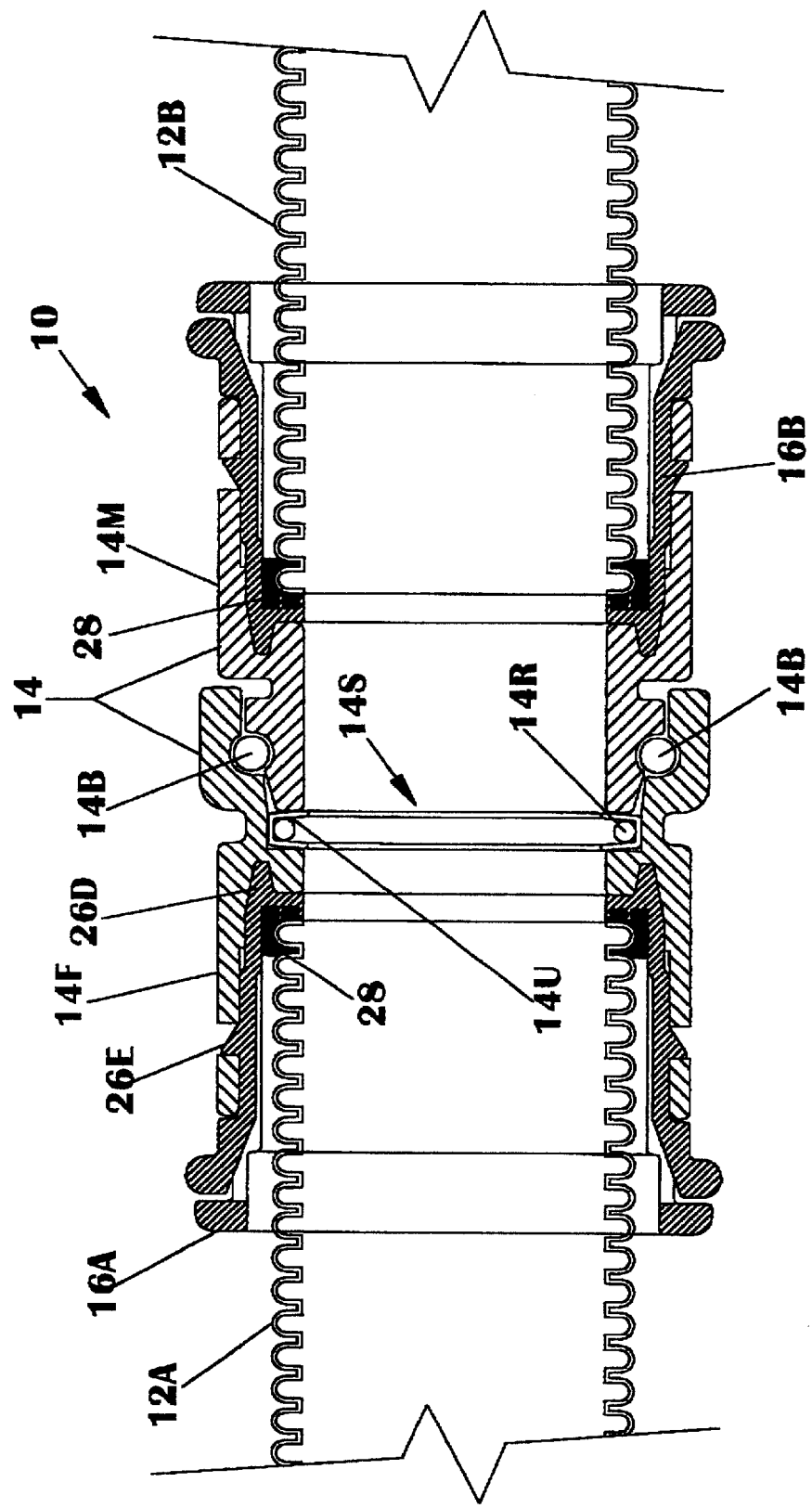
FIG. 2 is a side sectional view of the swivel connection apparatus of FIG. 1, taken from the reverse side along a plane which includes the axis of the generally cylindrical apparatus.

The figures, particularly FIGS. 1–2, illustrate a hose swivel connection apparatus 10 which is a preferred embodiment of this invention, used to connect hose sections 12A and 12B together to form a hose line 12, a portion of which is illustrated. Hose line 12 may include one hose swivel connection apparatus 12 or in some cases two or more such devices joining three or more hose sections, depending on the length of hose line 12—in order to minimize the tendency to kink by virtue of the movement of an automatic swimming pool cleaner tethered at the end of the hose line.

Hose swivel connection apparatus 10 is generally cylindrical in shape and, therefore, defines a central axis. All uses of the terms "axial" and "radial" in various forms in this document refer to the central axis extending along hose swivel connection apparatus 10.

Hose swivel connection apparatus 10 includes a swivel device 14 and a pair of hose-end couplings 16A and 16B. Hose-end couplings 16A and 16B are permanently secured to hose sections 12A and 12B, respectively, at the ends thereof and are removably attached to swivel device 14 on either side thereof Hose-end couplings 16A and 16B, which are identical to each other, facilitate quick and easy attachment and detachment of hose sections 12A and 12B to swivel device 14. Hose sections 12A and 12B are formed of standard hose stock of the type widely used with automatic swimming pool cleaners. Such hose has radial projections closely spaced along the length thereof which tend to enhance the bending flexibility of the hose, as is well known.

Swivel device 14, to which the hose-end couplings are removably attached, includes a male swivel member 14M and a female swivel member 14F which are held together in free swiveling relationship by a multiplicity of hard spherical bearing balls 14B. Swivel device 14 also includes a ring seal 14S positioned between male swivel member 14M and female swivel member 14F.

Figure 3:
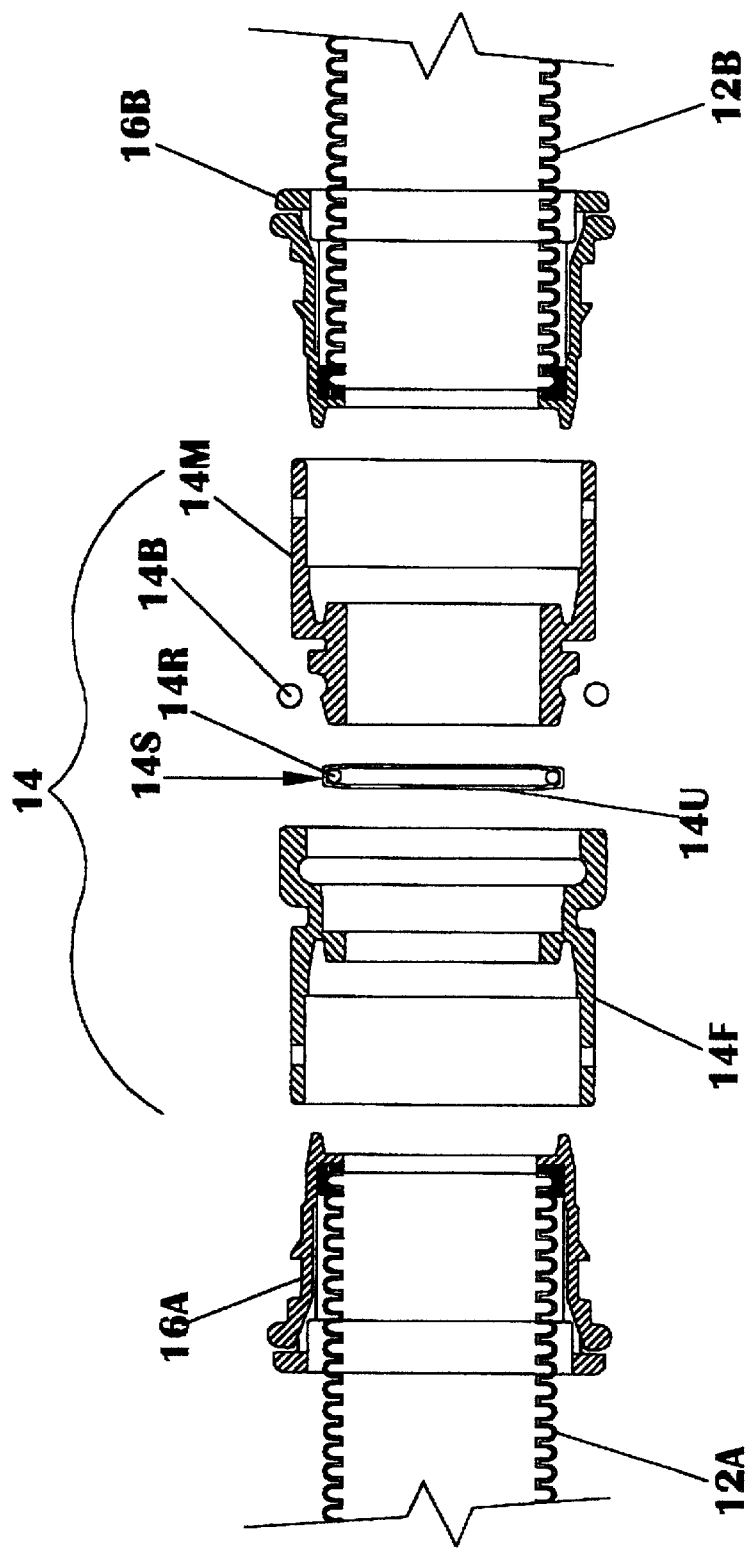
FIG. 3 is a reduced partially exploded side sectional view of FIG. 2.
Figure 4:
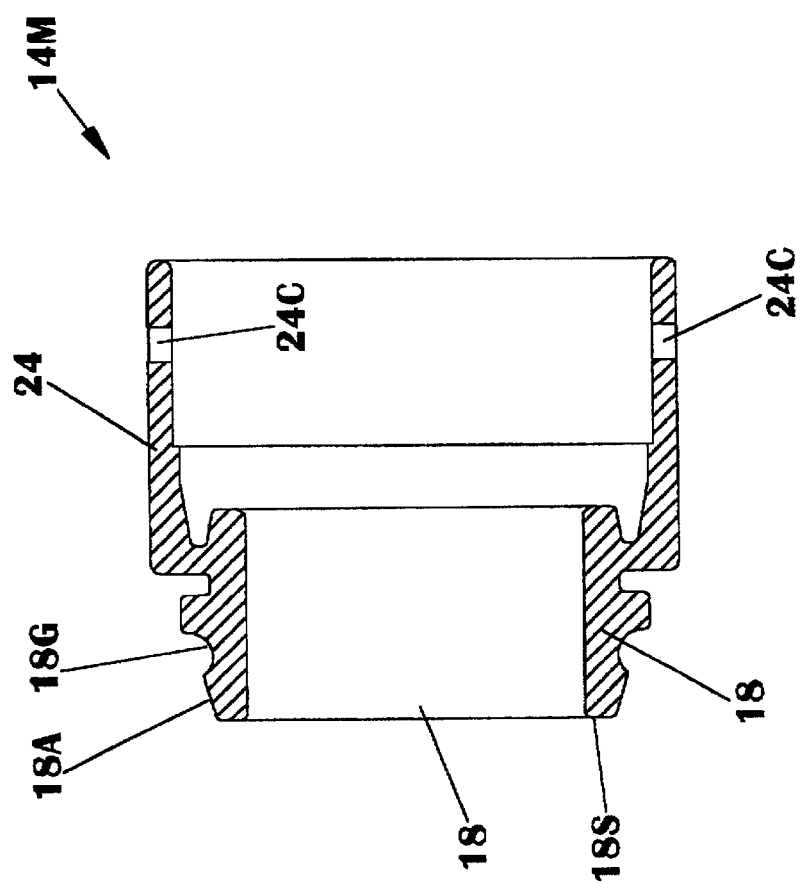
FIGS. 4 and 5 are side sectional views of the male and female swivel members, respectively, of such apparatus.

The specific relationships of the parts forming swivel device 14 are now described in detail:

As shown in FIGS. 2–4, best in FIG. 4, male swivel member 14M includes an underlap portion 18 and a coupling engagement portion 24. Male swivel member 14M is a unitary plastic piece molded of a suitable hard plastic material of a type well known in field of pool cleaners and the like. Suitable plastics or other materials are apparent to those skilled in the art who are made aware of this invention. Underlap portion 18 has an outer surface 18A with a radially-outwardly-facing first annular ball groove 18G encircling underlap portion 18 at one axial location. Underlap portion 18 also includes an axially-facing annular first seal-abutment surface 18S that forms the end of underlap portion 18.

Figure 5:
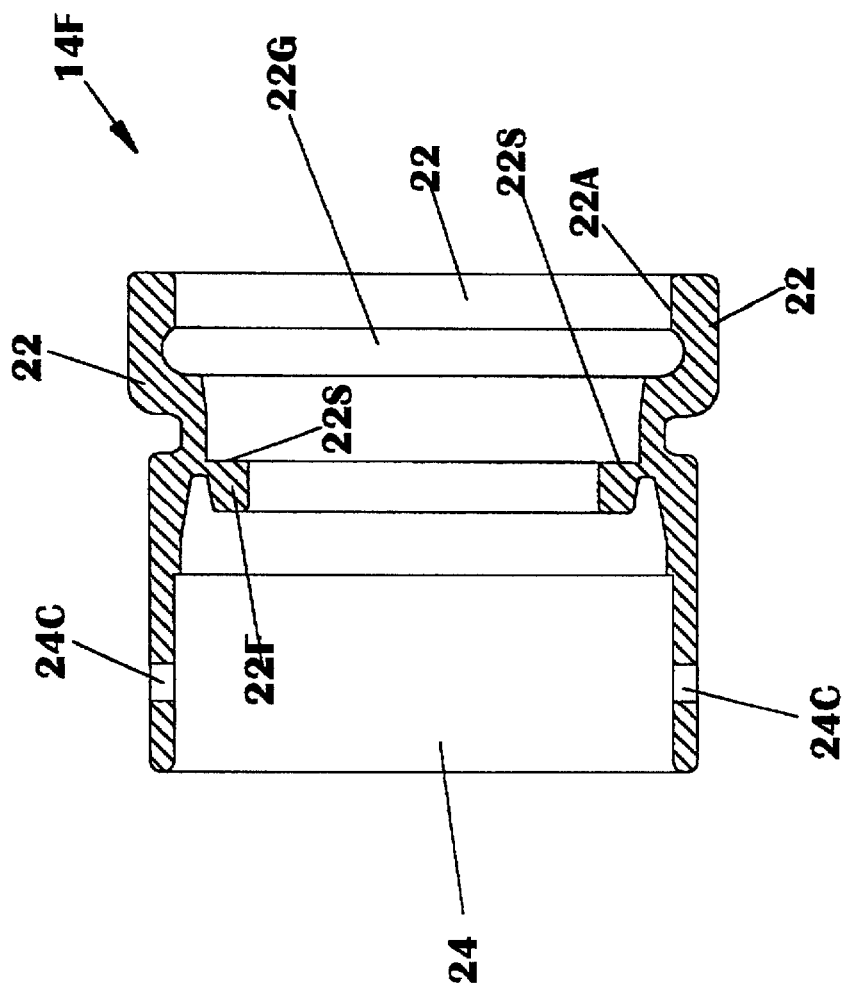

As shown in FIGS. 2, 3 and 5, best in FIG. 5, female swivel member 14F, like male swivel member 14M, is an integral piece molded of a suitable plastic material. Female swivel member 14F includes an overlap portion 22 which is concentric with and overlaps underlap-portion 18 of male swivel member 14M. Female swivel member also includes a coupling engagement portion 24. Overlap portion 22 has an inner surface 22A with a radially-inwardly-facing second annular ball groove 22G extending around the inner surface of overlap portion 22 at an axial location aligned with, and slightly radially spaced from, first ball groove 18G. Aligned first and second ball grooves 18G and 22G together define an annular ball-containing area which has a generally round cross-sectional area at all locations around swivel device 14.

Bearing balls 14B are captured in such anular ball-containing area, between first and second ball grooves 18G and 22G. Bearing balls 14B serve to provide free swiveling action between male and female swivel members 14M and 14F, and also serve the important function of reliably securing such swivel members together. Bearing balls 14B need not completely fill the annular ball-containing area; the number of bearing balls 14B used is a factor which determines strength of the inter-engagement of the swivel members.

Overlap portion 22 of female swivel member 14F also includes an inward flange 22F which forms a second seal-abutment surface 22S. Second seal-abutment surface faces first seal-abutment 18S. Inward flange 22F and second seal-abutment 22S are positioned approximately midway along the length of female swivel member 14F in position such that, when male and female swivel members 14M and 14F are engaged, first and second seal-abutment members 18S and 22S are spaced apart by a distance allowing ring seal 14S therebetween to create an appropriate water-tight seal between male and female swivel members 14M and 14F. The positioning of first and second seal-abutment surfaces 18S and 22S and first and second ball groves 18G and 22G are chosen to provide excellent sealing when male and female swivel members 14M and 14F are reliably engaged with one another by virtue of the multiplicity of bearing balls 14B in the aligned ball grooves.

Figure 6:
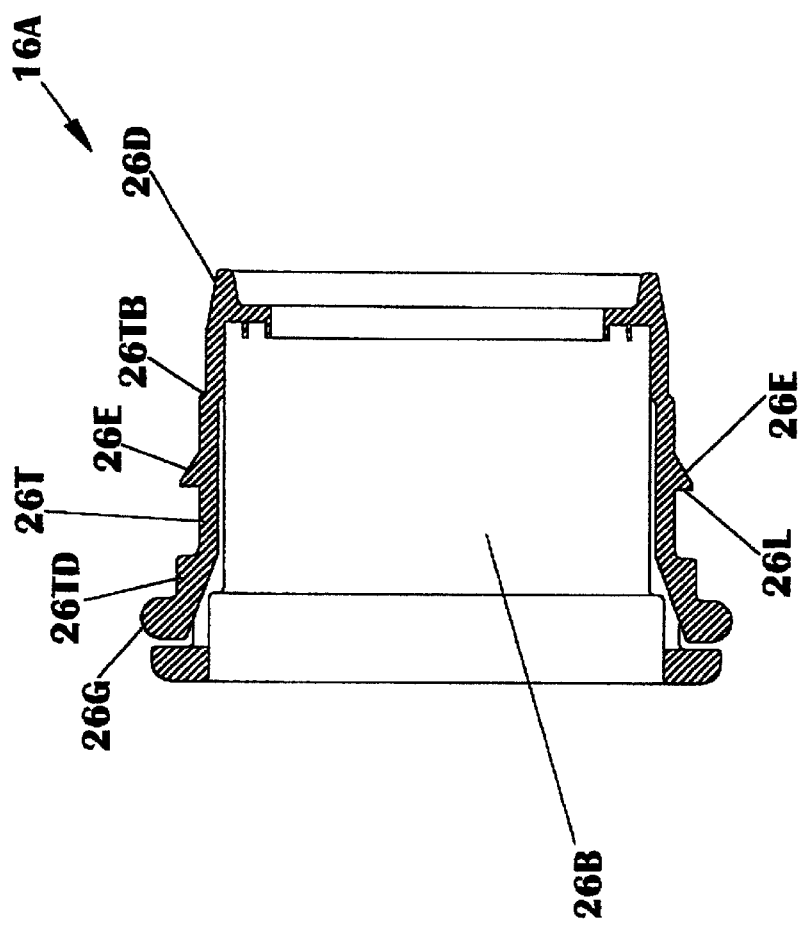
FIG. 6 is a side sectional view of one of the hose-end couplings of such apparatus, with the hose section removed.

Details of the two hose-end couplings will now be described by reference to hose-end coupling 16A, as illustrated best in FIGS. 2, 3 and 6. Hose-end coupling 16A is a unitary piece of molded plastic, which, as with swivel members 14F and 14M, may be formed of plastics such as are well known in field of pool cleaners and the like. The plastic chosen for hose-end couplings 16A and 16B is one which exhibits both hardness and resilience, such that when portions such as tongue-like portions 26T (see description below) are deflected they spring back to their original molded positions, to facilitate the snap-engagement referred to above. Suitable plastics (or other materials) are apparent to those skilled in the art who are made aware of this invention. The dimensioning, particularly the wall thickness, of the hose-end couplings is also chosen to facilitate such snap-engagement, which is described further below.

Hose-end coupling 16A includes a sleeve member 26 that is sleeved over hose section 12A near the end thereof Sleeve member 26 has a distal portion 26D which is permanently secured to the end of hose section 12A by a hot-melt adhesive 28. Such hot-melt attachment is both water-tight and highly reliable. Sleeve member 26 also includes a proximal portion 26P which includes means, hereafter described, facilitating the easy engagement of hose-end coupling 16A with female swivel member 14F.

More specifically, proximal portion 26P of sleeve member 26 has two detents 26E, each on its own axially-parallel tongue-like portion 26T of sleeve member 26. Tongue-like portions 26T, and thus detents 26E, are spaced 180° apart around sleeve member 26. Each tongue-like portion 26T, which forms a portion of sleeve member 26, is "hinged" to the remainder of sleeve member 26 at a proximal end 26TP of tongue-like portion 26 and extends to a distal end 26TD. Detent 26E is a slightly arcuate projection from tongue-like portion 26T positioned at a fixed axial location midway between proximal and distal ends 26TP and 26TD. Detent 26E includes an axially-facing arcuate ledge 26L. Tongue-like portion 26T also includes a grip portion 26G which projects radially therefrom at distal end 26TD. There are two tongue-like portions 26T and detents 26E on opposite sides of sleeve member 26, and this allows detents 26E to be radially depressed conveniently by gripping and squeezing grip portions 26G toward one another.

As shown in FIGS. 2, 3 and 5, coupling engagement portion 24 of female swivel member 14F has a pair of catch apertures 24C therethrough, spaced 180° apart, which are positioned to receive and engage detents 26E. Arcuate ledges 26L of detents 26E engage an arcuate edge surface of catch apertures 24C to restrain the disengagement of hose-end coupling 16A from female swivel member 14M, unless detents 26E are again depressed. The locations of catch apertures 24C are chosen such that detents 26E will be engaged therein when hose-end coupling 16A is fully engaged with female swivel member 14F.

Detents 26E remain securely within catch apertures 24C by virtue of the outward bias of tongue-like portions 26T, provided by the nature of the plastic material used for the hose-end coupling. In other words, this bias is effectuated by appropriate dimensioning and selection of plastic material for hose-end coupling 16A. Of course, similar structure exists with respect to hose-end coupling 16B and coupling engagement portion 24 of male swivel member 14M. Hose-end couplings 16A and 16B are identical, and each can be engaged with either male swivel member 14M or female swivel member 14F.

Hose-end coupling 16A and 16B have inner surfaces of somewhat larger diameter than the outer diameter of hose sections 12A and 12B, as illustrated best in FIGS. 2 and 3. Such dimensioning accommodates the manual depression of the detents, eliminating any need to compress the outer surfaces of the hose sections.

It should be noted that male and female swivel members 14M and 14F have inside surfaces defining cross-sectional areas congruent with the cross-sectional area defined by the hose inner surface. This allows substantially unrestricted flow of water and debris through hose swivel connection apparatus 10.

As shown in FIGS. 2 and 3, ring seal 14S between first and second seal-abutment surfaces 18S and 22S includes a rubber-like member 14U with a U-shaped cross-section and an ordinary O-ring seal 14R therein. Instead of such two-part seal, a simple O-ring seal of proper dimension is sufficient. A variety of annular seals can be used.

As will be apparent to those skilled in the art who are made aware of this invention, a variety of materials can be used effectively for various parts and a variety of design variations are possible.

While the principles of this invention have been described in connection with specific embodiments, it should be understood clearly that these descriptions are made only by way of example and are not intended to limit the scope of the invention.

What is claimed is:

1. In hose swivel connection apparatus for connecting a pair of hose sections along an axis, including hose-end couplings and a swivel device to which the hose sections are removably attached by the couplings, the improvement comprising:

a male swivel member adapted for removable attachment of one of the couplings and including an underlap portion having an outer surface with a radially-outwardly-facing first annular ball groove and an axially-facing annular first seal-abutment surface;

a female swivel member adapted for removable attachment of the other coupling and including an annular second seal-abutment surface facing the first seal-abutment surface and an overlap portion which overlaps the underlap portion and has an inner surface with a radially-inwardly-facing second annular ball groove aligned with the first ball groove;

bearing balls captured in and between the first and second ball grooves;

a ring seal between the first and second seal-abutment surfaces; and at least one of the hose-end couplings having a sleeve member which is sleeved over a hose section near the end thereof and has a distal portion permanently secured to the end of the hose and a proximal portion adapted for snap-engagement with one of the swivel members, whereby such coupling is easily attached to and detached from such swivel member.

2. The hose swivel connection apparatus of claim 1 wherein:

the proximal portion of such coupling sleeve member has at least one detent biased radially outwardly and depressible radially inwardly; and such swivel member has a coupling engagement portion which is sized to receive the sleeve member with the detent depressed and has at least one catch aperture receiving and engaging the detent by its outward bias.

3. The hose swivel connection apparatus of claim 2 wherein each of the hose-end couplings comprises a sleeve member which is sleeved over a hose section near the end thereof and has a distal portion permanently secured to the end of the hose and a proximal portion adapted for snap-engagement with one of the swivel members, whereby each coupling is easily attached to and detached from such swivel member.

4. The hose swivel connection apparatus of claim 3 wherein each of the swivel members has a coupling engagement portion which is sized to receive the sleeve member with the detent depressed and has at least one catch aperture receiving and engaging the detent by its outward bias, whereby either of the couplings is easily attached to and removed from either of the swivel members.

5. The hose swivel connection apparatus of claim 4 wherein the male and female swivel members have inside surfaces defining cross-sectional areas which are substantially congruent to the cross-sectional area of the hose, whereby flow through the couplings and the swivel device is substantially unrestricted.

6. The hose swivel connection apparatus of claim 1 wherein the distal portion of the coupling sleeve member is permanently secured to the end of the hose by an adhesive.

7. The hose swivel connection apparatus of claim 6 wherein the adhesive is a hot-melt adhesive.

8. The hose swivel connection apparatus of claim 1 wherein the male and female swivel members have inside surfaces defining cross-sectional areas which are substantially congruent to the cross-sectional area of the hose.

9. In hose swivel connection apparatus for swivelably connecting a hose section to a flow-line device along an axis, including a hose-end coupling and a swivel device to which the hose section is removably attached by the hose-end coupling, the improvement comprising:

male and female swivel members one of which is adapted for removable attachment to the hose-end coupling;

the male swivel including an underlap portion having an outer surface with a radially-outwardly-facing first annular ball groove and an axially-facing annular first seal-abutment surface;

the female swivel member including an annular second seal-abutment surface facing the first seal-abutment surface and an overlap portion which overlaps the underlap portion of the male swivel member and has an inner surface with a radially-inwardly-facing second annular ball groove aligned with the first ball groove;

bearing balls captured in and between the first and second ball grooves;

a ring seal between the first and second seal-abutment surfaces; and the hose-end coupling having a sleeve member which is sleeved over a hose section near the end thereof, the sleeve member having a distal portion permanently secured to the end of the hose and a proximal portion adapted for snap-engagement with the swivel member to which it is removably attachable.

10. The hose swivel connection apparatus of claim 9 wherein:

the proximal portion of such coupling sleeve member has at least one detent biased radially outwardly and depressible radially inwardly; and such swivel member has a coupling engagement portion which is sized to receive the sleeve member with the detent depressed and has at least one catch aperture receiving and engaging the detent by its outward bias.

11. The hose swivel connection apparatus of claim 10 wherein the swivel member that is adapted for removable attachment of the hose-end coupling has a coupling engagement portion which is sized to receive the sleeve member with the detent depressed and has at least one catch aperture receiving and engaging the detent by its outward bias, whereby the coupling is easily attached to and detached from such swivel member.

12. The hose swivel connection apparatus of claim 11 wherein the male and female swivel members have inside surfaces defining cross-sectional areas which are substantially congruent to the cross-sectional area of the hose, whereby flow through the coupling and the swivel device is substantially unrestricted.

13. The hose swivel connection apparatus of claim 9 wherein the distal portion of the coupling sleeve member is permanently secured to the end of the hose by an adhesive.

14. The hose swivel connection apparatus of claim 13 wherein the adhesive is a hot-melt adhesive.

15. The hose swivel connection apparatus of claim 9 wherein the male and female swivel members have inside surfaces defining cross-sectional areas which are substantially congruent to the cross-sectional area of the hose.

* * * * *